(12) United States Patent
Chiang et al.

(10) Patent No.: US 12,236,274 B2
(45) Date of Patent: Feb. 25, 2025

(54) METHOD FOR AUTOMATIC SCHEDULING OF TASKS, ELECTRONIC DEVICE EMPLOYING METHOD, AND COMPUTER READABLE STORAGE MEDIUM

(71) Applicant: Fulian Precision Electronics (Tianjin) Co., LTD., Tianjin (CN)

(72) Inventors: Chi-Chun Chiang, New Taipei (TW); Shao-Hsuan Fan, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 497 days.

(21) Appl. No.: 17/536,325

(22) Filed: Nov. 29, 2021

(65) Prior Publication Data

US 2023/0029609 A1 Feb. 2, 2023

(30) Foreign Application Priority Data

Jul. 28, 2021 (CN) .......................... 202110859663.9

(51) Int. Cl.
*G06F 9/50* (2006.01)
*G06F 9/48* (2006.01)

(52) U.S. Cl.
CPC .......... *G06F 9/5038* (2013.01); *G06F 9/5066* (2013.01); *G06F 9/4887* (2013.01); *G06F 2209/503* (2013.01)

(58) Field of Classification Search
CPC .... G06F 9/5038; G06F 9/5066; G06F 9/4887; G06F 2209/503
See application file for complete search history.

(56) References Cited

U.S. PATENT DOCUMENTS

| | | | |
|---|---|---|---|
| 2020/0012521 A1* | 1/2020 | Wu | G06N 5/022 |
| 2020/0364223 A1* | 11/2020 | Pal | G06F 16/24539 |
| 2021/0073170 A1* | 3/2021 | Liao | G06N 20/00 |
| 2021/0318908 A1* | 10/2021 | Cavus | G06N 3/105 |

FOREIGN PATENT DOCUMENTS

| | | |
|---|---|---|
| CN | 112269650 A | 1/2021 |
| CN | 112988390 A | 6/2021 |

* cited by examiner

*Primary Examiner* — Dong U Kim
(74) *Attorney, Agent, or Firm* — ScienBiziP, P.C.

(57) ABSTRACT

A method for the automatic scheduling of tasks obtains data processing tasks and data sources. A job queue is formed based on the data processing tasks. The job tasks are extracted in order from the job queue. Computing resources are distributed based on the extracted job tasks. A result of the data processing task is obtained by the pre-trained model based on the data source. An electronic device and a computer readable storage medium applying the method are also provided.

20 Claims, 2 Drawing Sheets

METHOD FOR AUTOMATIC SCHEDULING OF TASKS, ELECTRONIC DEVICE EMPLOYING METHOD, AND COMPUTER READABLE STORAGE MEDIUM

FIELD

The subject matter herein generally relates to scheduling, specifically to method for automatically scheduling tasks, an electronic device employing the method, and a computer readable storage medium.

BACKGROUND

Edge computing is a privacy free data computing relying on cloud data. An edge computing apparatus collects data and pre-processes the collected data. When there is a requirement for privacy, cloud data not available for use. A private cloud that ensures data privacy is expensive. Under the privacy enforced state, an edge computing apparatus with a graphic processing unit (GPU) is provided. The edge computing apparatus with the GPU generally requires professional personnel to operate the edge computing apparatus.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

Figure 1:
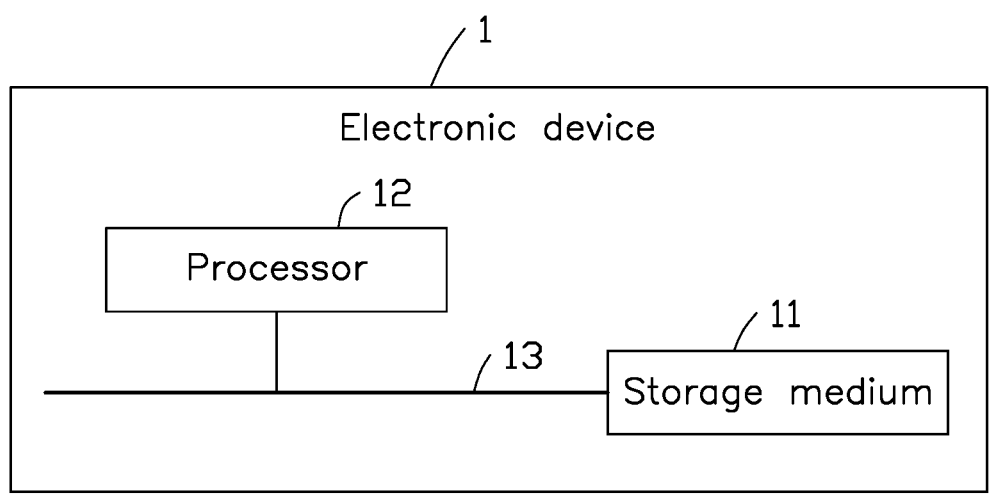
FIG. 1 is a diagram illustrating an embodiment of an electronic device according to the present disclosure.

FIG. 1 shows an electronic device 1. The electronic device 1 includes a storage medium 11 and at least one processor 12, not being limited. The storage 11 and the at least one processor 12 communicate with each other through a communication bus 13 or directly communicate with each other.

The electronic device 1 can be a device with application programs, such as a computer, a mobile phone, a tablet, a personal digital assistant (PDA), and the like. The structure of the electronic device 1 as shown in FIG. 1 does not constitute a limitation on the electronic device 1, and the electronic device 1 may include more or fewer parts than that shown in the figure, or combine some parts, or have different arrangement of the parts. For example, the electronic device 1 also can include input output device, network device, and bus, and the like.

Figure 2:
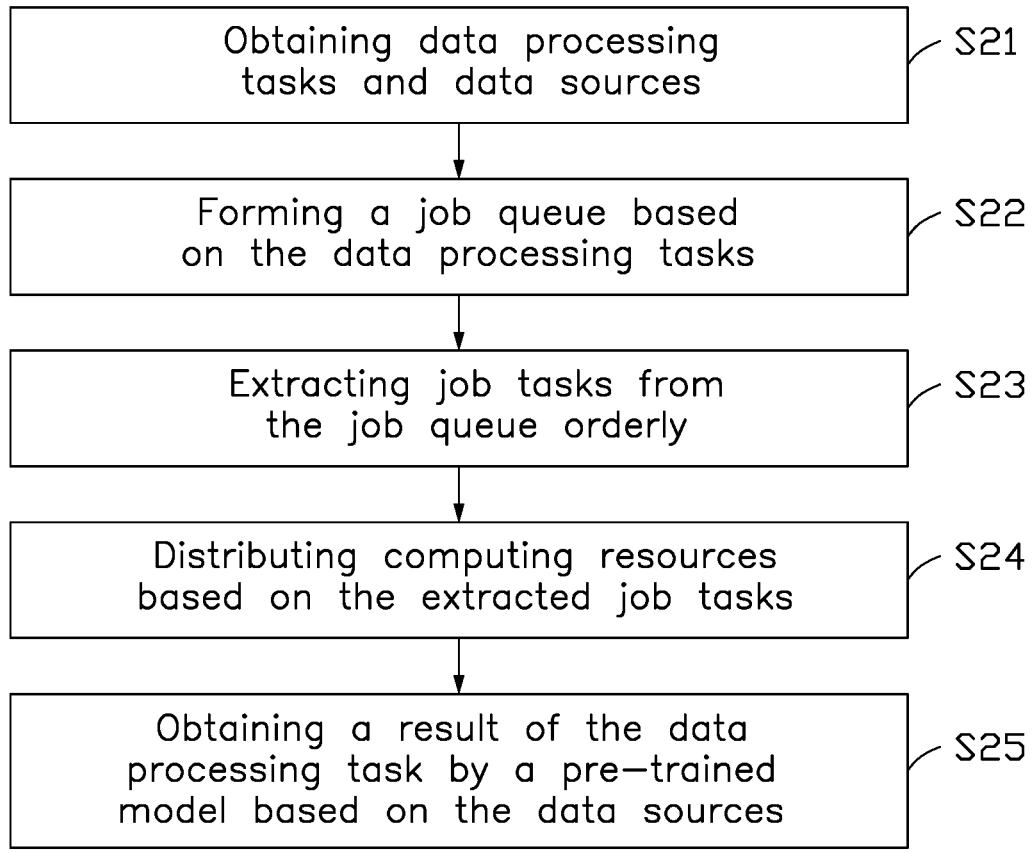
FIG. 2 is a flowchart illustrating an embodiment of method for the automatic scheduling of tasks according to the present disclosure.

FIG. 2 shows a flowchart of a method for automatically scheduling tasks used in the electronic device 1. Due to different requirements, a sequence of steps in the flowchart diagram can be changed, and some steps can be omitted. The method includes the following steps, these steps may be re-ordered:

In block S21, data processing tasks and data sources are obtained.

In one embodiment, a data analysis engine architecture with abilities in scheduling tasks and data collecting can automatically schedule the tasks for optimizing source allocation and collect data, which are stored according to well-known manners. For automatically scheduling the tasks, the data processing tasks and the data source need to be obtained.

In one embodiment, the data processing tasks are obtained by a client or the electronic device 1. The data processing tasks are stored in the electronic device 1. The data processing tasks can include any one of or a combination of tasks which interact with external computers, a task of reading files in different formats (such as txt, csv, doc, and the like) and preparing data in database, a task of processing, cleaning, and deforming the data for converting and analyzing the data, a task of computing in math and statistics to form a new data set, a task of establishing a model and computing for showing the data by applied to a statistics model, a machine learning, or other type of computing tool, a task of forming a graph, an image, or an abstract, and the like. For example, the data processing task is a task of detecting human faces in an image.

In one embodiment, the data source is a basic data used in the data processing tasks. For example, where the data processing task is the detection of human faces in the target image, the data source is the target image.

In one embodiment, the step of obtaining the data processing tasks and the data source can include any one of or a combination of ones of receiving the data source transmitted by a server interface, receiving the data source transmitted by a client interface, or receiving the data source transmitted by a file storage protocol.

In block S22, a job queue is formed based on the data processing tasks.

Each data processing task is broken down into several job tasks and the job queue is formed based on the job tasks, thus the data processing tasks can be effectively executed.

In one embodiment, the step of forming the job queue based on the data processing tasks includes:

In step (1), each data processing task is broken down into job tasks. In detail, the data processing task is broken down into the job tasks based on steps for execution. For example, where detecting human faces in a target image is the data processing task, the job tasks include a first job task of pre-processing the target image, such as applying normalization and gamma correction; a second job task is inputting the processed target image into a pre-trained detection model; and a third job task is achieving face detection as a result.

In step (2), a logic dependence relationship is formed. The job tasks are executed in sequence, thus the logic dependence relationship needs to be formed. For example, for detecting human faces in a target image, the second job task is executed after the first job task, and the third job task is executed after the second job task. Thus, the job tasks are arranged in order based on the logic dependence relationship, such as the first job task, the second job task, and the third job task.

In step (3), a frequency of execution of each job task is set. For example, the execution frequency can be twice in each period.

In step (4), the job queue is formed based on the job tasks, the logic dependence relationship, and the execution frequency. For example, for detecting human faces in the target image, the job queue is the first job task (pre-processing the target image) with a first execution frequency, which is twice in each period, the second job task (inputting the processed target image into the pre-trained detection model) has a second execution frequency, which is once in each period; the third job task (obtaining a result of face detection) has the second execution frequency, which is once in each period.

In block S23, the job tasks are orderly extracted from the job queue.

In one embodiment, the step of extracting the job tasks from the job queue include confirming an operation sequence based on the logic dependence relationship. The job tasks are orderly extracted from the job queue based on the operation sequence.

In detail, the logic dependence relationship serves as the operation sequence.

In one embodiment, the method further includes setting an execution time period of the data processing tasks. For example, the execution time period can be from 12 o'clock to 1:00 pm. The execution time period represents the time period of the electronic device 1 executing the data processing tasks.

By setting the execution time period, the data processing tasks are distributed equitably, and a load of the server is reduced at the same time. Effectivity of the data processing is also improved.

After the block S22, the method further includes confirming models required by the job tasks. A latest model list is obtained from a model repository in a cloud and the models required by each job task are downloaded into the electronic device 1.

In detail, when the models of the job tasks are confirmed, the latest model list is obtained from the model repository through an edge port. The models in the latest mode list required by the job tasks are downloaded into the electronic device 1 with the data processing tasks. When switching from a blocking state into a transferring state, the edge port can quickly transfer the models without delay.

In block S24, computing resources are distributed based on the extracted job tasks.

For improving a usage of the computing resources in computing, the computing resources need to be distributed.

In one embodiment, the computing resources include a central processing unit (CPU) resource, a memory resource, a hard disk resource, and a network resource. Before executing the job tasks, the electronic device 1 applies for the computing resources. When the computing resources are enough for executing the job tasks, the electronic device 1 can execute the job tasks.

In one embodiment, the step of distributing the computing resources includes obtaining a number of the computing resources required by each job task. A resource permission time point of each computing resource is obtained based on the number of the computing resources. The computing resources are provided to the extracted job task at the resource permission time point.

In one embodiment, the step of providing the computing resources to the extracted job task at the resource permission time point includes providing static computing resources to the extracted job task at the resource permission time point, or providing computing dynamic resources to the extracted job task at the resource permission time point.

In detail, the electronic device 1 automatically computes a number of computing resources required by each job task. When executing the job task, the electronic device 1 obtains self-computing resources. When the number of the computing resources required by the job task is less than a number of the self-computing resources, the computing resources are distributed to the job task and the job task is added into the job queue. For example, the data processing task may include a first job task and a second job task. The number of the computing resources required by the first job task is 1, and the number of the computing resources required by the second job task is 2. When the self-computing resource of the electronic device 1 is 2, the first job task is added into the job queue for execution. After executing the first job task, the self-computing resource of the electronic device 1 is 1, the electronic device 1 forecasts the resource permission time point of the second job task. When the resource permission time point of the second job task is reached, the second job task is added into the job queue for execution.

By distributing computing resources, redundancy and non-use of the resources is reduced, and an efficiency of the data processing is improved.

In block S25, a result of the data processing task is obtained by the pre-trained model based on the data source.

In data processing, the pre-trained model is needed for analyzing the data.

In one embodiment, the step of obtaining a result of the data processing task by the pre-trained model based on the data source includes inputting the data source into a first pre-trained model based on the first extracted job task. The result of the first job task is obtained. The result of the first job task is inputted into a second pre-trained model based on the second extracted job task and the result of the second job task is obtained. The result of the previous job task is inputted into a pre-trained model corresponding to a next extracted job task based on the next extracted job task, until the result of a last job task is obtained. The result of the last job task serves as the result of the data processing task.

In use, when executing the data processing task, the electronic device 1 extracts the first job task in the job queue. When the number of the computing resources required by the first job task is less than the number of the computing resources, the first job task is executed. The data source corresponding to the first job task is inputted into the first pre-trained model and the result of the first job task is obtained. Then, the second job task is extracted. When the number of the computing resources required by the second job task is less than the number of the computing resources, the second job task is executed. The result of the first job task is inputted into the second pre-trained model and the result of the second job task is obtained. Then, a next job task is extracted. When the number of the computing resources required by the next job task is less than the number of the computing resources, the next job task is executed. The result of the next job task is inputted into the pre-trained model corresponding to the next job task. The result of the next job task is obtained and so on, until the last job task is extracted. When the number of the computing resources required by the last job task is less than the number of the computing resources, the last job task is executed. The result of the last job task is inputted into the pre-trained model corresponding to the last job task. The result of the last job task is obtained and serves as the result of the data processing task.

In detail, a pre-training process of the model can include obtaining training data. The training data is inputted into a pre-formed neutral network frame for training to obtain the model. Test data is obtained. The model is tested by the test data and a pass rate is obtained. When the pass rate is greater than a specified passing threshold, the model serves as the trained model.

The tasks are scheduled by the computing resources and the usage of the resources is improved. Data is automatically collected. Users only need to provide the data source, and the data can be sustained analysis.

Referring to FIG. 1, in one embodiment, the storage medium 11 is an internal storage of the electronic device 1, which is embedded in the electronic device 1. In other embodiments, the storage medium 11 can be an external storage medium 11, which is coupled to the electronic device 1.

In some embodiments, the storage medium 11 stores program codes and various data. The storage medium 11 realizes high speed and automatic access of the program or data during operations on the electronic device 1.

The storage medium 11 can be a random-access storage medium, or a non-volatile storage, such as a hard disk, a memory, a plug-in hard disk, a smart media card (SMC), a secure digital (SD), a flash card, a disk storage component, a flash component, or other volatile solid memory.

In one embodiment, the processor 12 can be a central processing unit (CPU), or other universal processor, such as a digital signal process (DSP), an application specific integrated circuit (ASIC), a field-programmable gate array (FPGA), or other programmable logic component, discrete gate or transistor logic, discrete hardware components, and so on. The universal processor can be a microprocessor or the at least one processor can be any regular processor, or the like.

If the modules/units of the storage medium 11 are implemented in the form of or by means of a software functional unit installed in independent or standalone product, all parts of the integrated modules/units of the storage unit may be stored in a computer-readable storage medium. One or more programs are used to control the related hardware to accomplish all or parts of the methods of this disclosure. The one or more programs can be stored in a computer-readable storage medium. The one or more programs can accomplish the exemplary method when executed by the at least one processor 12. The program codes can be in the form of source code, object code, executable code file, or in some intermediate form. The computer-readable storage medium may include any entity or device capable of carrying the program codes, recording media, USB flash disk, mobile hard disk, disk, computer-readable storage medium, read-only memory, and the like.

Division of the modules is a division according to logical function, and other division manners may be adopted during practical implementation. Each function module in each embodiment of the present disclosure may be integrated into a processing module, each module may also exist independently and physically, and two or more than two modules may also be integrated into a module. The above-mentioned integrated module may be implemented in a form of hardware and may also be implemented in forms of hardware and software function module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatically scheduling tasks, applicable in an electronic device; the electronic device comprises a non-transitory storage medium with program codes and a processor; the processor executes the program codes in the non-transitory storage medium to implement the method; the method comprises following steps:
    obtaining data processing tasks and data sources corresponding to each of the obtained data processing tasks;
    forming a job queue including a plurality of job tasks, which is obtained by breaking down the data processing task, wherein the job queue comprises an execution frequency and a logic dependence relationship for each of the plurality of job tasks based on a detected content of the data sources associated with each of the plurality of job tasks;
    extracting the plurality of job tasks from the job queue according to an operation sequence of the plurality of job tasks of the job queue;
    distributing computing resources required by each of the plurality of job tasks extracted from the job queue based on a resource permission time point of each computing resource of the computing resources; and
    obtaining a result of the data processing tasks based on executing each of the plurality of job tasks according to the operation sequence when the computing resources in the electronic device is more than the computing resource required by one of the plurality of job tasks being executed and then inputting the data sources into a pre-trained model corresponding to one of the plurality of the executed job task, wherein a passing rate of the data sources is greater than a specified threshold.

2. The method of claim 1, wherein the step of obtaining data sources comprises any one of or a combination of ones of receiving the data sources transmitted by a server interface, receiving the data sources transmitted by a client interface, or receiving the data sources transmitted by a file storage protocol.

3. The method of claim 1, wherein the step of forming the job queue including a plurality of job tasks, which is obtained by breaking down each data processing task-comprises:
    breaking down each data processing task into the plurality of job tasks of the job queue;
    establishing the logic dependence relationship for indicating a sequence between the plurality of job tasks of the job queue;
    setting the execution frequency of each of the plurality of job tasks; and
    forming the job queue based on the plurality of job tasks.

4. The method of claim 3, wherein the step of extracting the plurality of job tasks from the job queue according to the operation sequence of the plurality of job tasks of the job queue comprises:
    confirming the operation sequence of the plurality of job tasks of the job queue based on the logic dependence relationship; and
    extracting the plurality of job tasks from the job queue according to the operation sequence.

5. The method of claim 4, wherein the step of distributing computing resources to each of the plurality of job tasks extracted from the job queue based on a resource permission time point of each computing resource of the computing resources comprises:
    obtaining a number of the computing resources required by each of the plurality of job tasks;
    obtaining the resource permission time point of each of the computing resources based on the number of the computing resources; and
    providing the computing resources to each of the plurality of job tasks being extracted from the job queue at the resource permission time point.

6. The method of claim 5, wherein the step of providing the computing resources to each of the plurality of job tasks being extracted from the job queue at the resource permission time point further comprises:
    providing static computing resources to each of the plurality of job tasks extracted from the job queue at the resource permission time point; or
    providing dynamic computing resources to each of the plurality of job tasks extracted from the job queue at the resource permission time point.

7. The method of claim 1, wherein the method further comprises:
    confirming models required by the plurality of job tasks of the job queue; and
    obtaining a latest model list from a model repository in a cloud and downloading the models required by each of the plurality of job tasks into the electronic device.

8. The method of claim 1, wherein the method further comprises:
    inputting the data sources into a first pre-trained model based on a first job task being firstly extracted from the job queue, and obtaining a result of the first job task;
    inputting the result of the first job task into a second pre-trained model based on a second job task being secondly extracted from the job queue, and obtaining a result of the second job task;
    inputting the result of a previous job task being previously extracted from the job queue into a next pre-trained model based on a next job task being subsequently extracted, and obtaining a result of the next job task; and
    serving a result of a last job task being lastly extracted from the job queue as the result of the data processing task.

9. An electronic device comprises a non-transitory storage medium with program codes, which when being executed by a processor, cause the processor to:
    obtain data processing tasks and data sources corresponding to each of the obtained data processing tasks;
    form a job queue including a plurality of job tasks, which is obtained by breaking down the data processing task, wherein the job queue comprises an execution frequency and a logic dependence relationship for each of the plurality of job tasks based on a detected content of the data sources associated with each of the plurality of job tasks;
    extract the plurality of job tasks from the job queue according to an operation sequence of the plurality of job tasks of the job queue;
    distribute computing resources required by each of the plurality of job tasks extracted from the job queue based on a resource permission time point of each computing resource of the computing resources; and
    obtain a result of the data processing tasks based on executing each of the plurality of job tasks according to the operation sequence when the computing resources in the electronic device is more than the computing resource required by one of the plurality of job tasks being executed and then input the data sources into a pre-trained model corresponding to one of the plurality of the executed job task, wherein a passing rate of the data sources is greater than a specified threshold.

10. The electronic device of claim 9, wherein, the processor further:
    receive the data sources transmitted by a server interface, or receive the data sources transmitted by a client interface, or receive the data sources transmitted by a file storage protocol.

11. The electronic device of claim 9, wherein the processor further:
    break down each data processing task into the plurality of job tasks of the job queue;
    establish the logic dependence relationship for indicating a sequence between the plurality of job tasks of the job queue;
    set the execution frequency of each of the plurality of job tasks; and
    form the job queue based on the plurality of job tasks.

12. The electronic device of claim 11, wherein the processor further:
    confirm the operation sequence of the plurality of job tasks in the job queue based on the logic dependence relationship; and
    extract the plurality of job tasks from the job queue according to the operation sequence.

13. The electronic device of claim 12, wherein the processor further:
    obtain a number of the computing resources required by each of the plurality of job tasks;
    obtain the resource permission time point of each of the computing resources based on the number of the computing resources; and
    provide the computing resources to each of the plurality of job tasks being extracted from the job queue at the resource permission time point.

14. The electronic device of claim 13, wherein the processor further:
    provide static computing resources to each of the plurality of job tasks extracted from the job queue at the resource permission time point; or
    provide dynamic computing resources to each of the plurality of job tasks being extracted from the job queue at the resource permission time point.

15. The electronic device of claim 9, wherein the processor further:
    confirm models required by the plurality of job tasks of the job queue; and
    obtain a latest model list from a model repository in a cloud and download the models required by each of the plurality of job tasks job task into the electronic device.

16. The electronic device of claim 9, wherein the processor further:
    inputting the data sources into a first pre-trained model based on a first job task being firstly extracted from the job queue, and obtaining a result of the first job task;
    inputting the result of the first job task into a second pre-trained model based on a second job task being secondly extracted from the job queue, and obtaining a result of the second job task;
    inputting the result of a previous job task being previously extracted from the job queue into a next pre-trained model based on a next job task being subsequently extracted, and obtaining a result of the next job task; and serving a result of a last job task being lastly extracted from the job queue as the result of the data processing task.

17. A non-transitory computer readable storage medium stores program codes; the program codes are executed by at least one processor to implement the following steps:

obtaining data processing tasks and data sources corresponding to each of the obtained data processing tasks;

forming a job queue including a plurality of job tasks, which is obtained by breaking down the data processing task, wherein the job queue comprises an execution frequency and a logic dependence relationship for each of the plurality of job tasks based on a detected content of the data sources associated with each of the plurality of job tasks;

extracting the plurality of job tasks from the job queue according to an operation sequence of the plurality of job tasks of the job queue;

distributing computing resources required by each of the plurality of job tasks extracted from the job queue based on a resource permission time point of each computing resource of the computing resources; and obtaining a result of the data processing tasks based on executing each of the plurality of job tasks according to the operation sequence when the computing resources in the electronic device is more than the computing resource required by one of the plurality of job tasks being executed and then inputting the data sources into a pre-trained model corresponding to one of the plurality of the executed job task, wherein a passing rate of the data sources is greater than a specified threshold.

18. The non-transitory computer readable storage medium of claim 17, wherein the step of forming the job queue based on the data processing tasks comprises:

breaking down each data processing task into the plurality of job tasks of the job queue;

establishing the logic dependence relationship for indicating a sequence between the plurality of job tasks of the job queue;

setting the execution frequency of each of the plurality of job tasks; and forming the job queue based on the plurality of job tasks.

19. The non-transitory computer readable storage medium of claim 18, wherein the step of extracting the plurality of job tasks from the job queue according to the operation sequence of the plurality of job tasks of the job queue comprises:

confirming the operation sequence of the plurality of job tasks of the job queue based on the logic dependence relationship; and extracting the plurality of job tasks from the job queue according to the operation sequence.

20. The non-transitory computer readable storage medium of claim 17, wherein the step of distributing computing resources to each of the plurality of job tasks extracted from the job queue based on a resource permission time point of each computing resource of the computing resources comprises:

obtaining a number of the computing resources required by each of the plurality of job tasks;

obtaining the resource permission time point of each of the computing resources based on the number of the computing resources; and providing the computing resources to each of the plurality of job tasks being extracted from the job queue at the resource permission time point.

* * * * *